United States Patent [19]
Gillies et al.

[11] 3,923,206
[45] Dec. 2, 1975

[54] SEED SEPARATOR WITH ADJUSTMENT FOR DIFFERENT SEED SIZES

[75] Inventors: David Gillies, Lyminge; Robert Anthony Willis, Hythe, both of England

[73] Assignee: Stanhay (Ashford) Limited, England

[22] Filed: Sept. 13, 1973

[21] Appl. No.: 396,696

[30] Foreign Application Priority Data
Nov. 16, 1973 United Kingdom............ 33765/73

[52] U.S. Cl.............. 222/371; 111/77; 111/85; 111/86; 221/253
[51] Int. Cl.² .......................................... A01C 7/04
[58] Field of Search ...... 221/85, 253, 263; 222/371, 222/415; 111/34, 77, 85, 86

[56] References Cited
UNITED STATES PATENTS

| | | | |
|---|---|---|---|
| 288,080 | 11/1883 | Lowrey | 222/371 X |
| 1,264,454 | 4/1918 | Terrell | 222/371 X |
| 1,614,378 | 1/1927 | Micka | 222/415 X |
| 1,761,065 | 6/1930 | Bausman | 222/371 X |
| 2,770,400 | 11/1956 | Mattson | 222/371 X |
| 3,272,159 | 9/1966 | Sanderson | 222/371 |
| 3,279,658 | 10/1966 | Dinges | 222/371 X |

*Primary Examiner*—Robert B. Reeves
*Assistant Examiner*—Thomas E. Kocovsky
*Attorney, Agent, or Firm*—Larson, Taylor and Hinds

[57] ABSTRACT

Seed spacing means wherein a single row or plurality of rows of spaced apart seed may be sown with pre-determined spacing along said rows and when sowing a plurality of rows per single run. Pre-determined spacing is provided between the rows and a plurality of seed spacing means may be coupled in side by side relationship or in tandem array to increase the area of coverage per single run, the seed being sown at regular pre-selectable depths.

2 Claims, 14 Drawing Figures

SEED SEPARATOR WITH ADJUSTMENT FOR DIFFERENT SEED SIZES

The present invention relates to towable mechanical machinery for spacing the sowing of seeds along one or more drills wherein the distance between drills is pre-determinable, the spacing of seeds within each drill is pre-determinable and the drilling may be undertaken in conditions hitherto considered unfavourable.

Broadly the invention comprises towable mechanical machinery consisting of a plurality of mechanical seeders each seeder having a hopper or seed container and a seed chamber with a seed conveyor passing therethrough adapted to transport seed at a pre-determined rate to a seed exit, the mechanical seeders being at least partly supported on a rotatable wheel having anti-accretion means.

Preferably the mechanical seeders are each fitted to an elongated support framework mounted upon two rotatable wheels having anti-accretion means. One of the two wheels, being located at the front of the framework and of a generally wide flat tyre design, acts as a roller and may have a blade attached thereto for cutting stubble, etc. The other wheel, in line with the front wheel but located at the back end of the framework may also be of a generally wide flat tyred design for lightly rolling the ground after the seed has been deposited. For ground prone to capping, and for seed sowing with the ground generally wet, the rear wheel may have a centrally disposed circumferential recess where a single line of seed is to be sown from a mechanical seeder or a mesh type wheel where a plurality of rows are to be sown in one operation. The two latter alternatives assist seed germination as the ground above the seed is not hard packed or compressed. Scrapers may be fitted to the front and rear wheels to stop accretion of earth or mud.

It is preferred that the seed conveyor takes the form of a continuous belt having holes disposed along its length. This belt may take various forms e.g. a single longitudinal line of holes for single row drilling, two longitudinal lines of holes for double row drilling or treble longitudinal lines of holes for treble row drilling from the one mechanical seeder. Thickness of the belt, diameter or size of holes and number of holes in a longitudinal line is dependent on type of seed to be sown, distance between each sown seed, whether seeds are to be sown singly or in clusters and how many rows of seed are to be sown from one mechanical seeder per single run. The belts may be manufactured from rubber or canvas, either plain or ribbed, or from a plastics material. Normally small seeds such as brassica are sown easier with a plain belt, for larger seeds a ribbed belt is preferred and belts manufactured from plastics are normally used for thin seeds such as lettuce or carrot.

The belt is preferably driven via belt and/or chain drives from a common drive shaft driven by a ground engaging drive wheel, or wheels, dependent on the number of mechanical seeders coupled together. Preferably the ground engaging drive wheel is a pneumatic rubber tyred wheel of greater diameter than the aforementioned front and rear wheels on the elongated support frame.

Movement of the belt through the seed chamber permits seed to be collected in the cavities formed by the holes in the belt and a spring base over which the belt travels. The spring base may be smooth or may have a shallow groove, or a plurality of grooves, along its length dependent on type of seed and belt in use. Excess seed in the cavities is ejected by a seed rejector which comprises a wheel, preferably rubber tyred rotating in a direction opposite to that of the seed belt. As there is minimal clearance between the wheel and the inside surface of the belt, peripheral contact by the wheel with excess seed ejects the seed upwards and away from the belt. The seed rejector wheel may be made easily changeable and may be flat on the periphery or may be made with a slight peripheral concavity for larger types of seed. Though the seed rejector is preferably a separate wheel, for ease of interchangeability, it may comprise a further belt rotating in the opposite direction to the seed belt or the seed belt may be routed to run over a smaller diameter wheel, cited in the same position as the seed rejector wheel, by the use of suitable idler rollers to thereby form a seed rejector. However, in practice this is not advantageous as it is preferable to have the periphery of the seed rejector moving at approximately twice the speed of the seed belt.

Fitted within a recess in the seed chamber is a seed chamber choke designed to control the amount of seed in the seed chamber thus preventing too much seed entering the seed chamber and causing excessive wear to the seed rejector and damage to the seed.

Electrical monitoring of the seed belt and adequate seed in the drill may be fitted. Variations in the speed of the seed conveyor belt relative to the forward speed of the towable mechanical machinery may be obtained and will be hereinafter described.

A coulter fitted beneath the seed exit may be designed with one or a plurality of seed channels for use with the appropriate seed belt dependent on the number of rows desired to be sown from one mechanical seeder.

The invention will now be described, by way of example only, in conjunction with the accompanying drawings in which.

Figure 1:
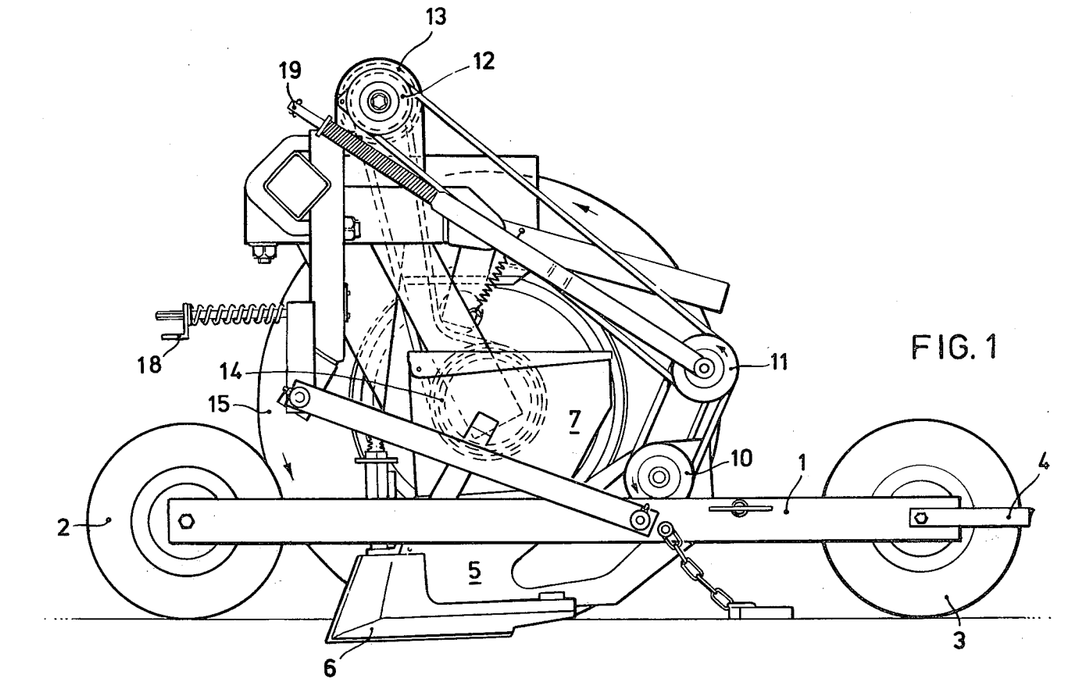
FIG. 1 shows a side view of the towable mechanical machinery including ground engaging wheel and drive means to a single mechanical seeder.

Referring now to FIG. 1 an elongated support framework 1 is mounted on a front roller type wheel 2 and a rear roller type wheel 3, the rear roller type wheel 3 having a scraper 4 operatively connected to stop accretion. Though not shown, a scraper may also be fitted to the front roller type wheel 2. Mounted within the elongated support framework 1 is a mechanical seeder generally shown as 5 with a coulter 6 located on the ground facing surface of the seeder. On the top of the mechanical seeder and forming a part thereof is a hopper 7 for containing seed to be fed via a chute to a seed chamber 8 fitted with a seed chamber choke 9, clearly shown on FIG. 5. A drive wheel 10 driven by a belt or chain drive via wheels 11, 12, 13 and a pulley wheel 14 attached to and driven by a ground engaging drive wheel 15 drives gearing within the mechanical seeder 5 for propulsion of a seed conveyor 16 and seed rejector 17 shown on FIG. 5. A spring loaded control 18 adjusts pressure on the rear roller type wheel 3 and a control 19 adjusts tension of the belts or chain drives between wheels 10, 11 and 12 which will change through variations in depth of the coulter 6 in the ground.

Figure 2:
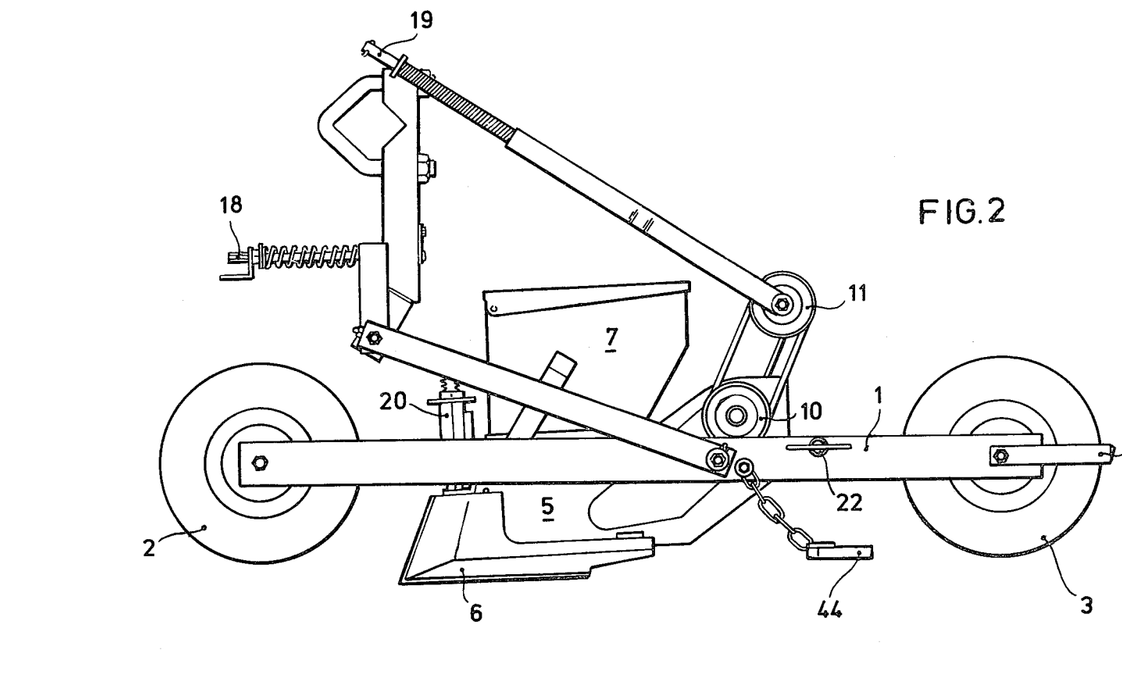
FIG. 2 shows a side view of a single mechanical seeder.

Referring now to FIG. 2 wherein certain equipment is removed for clarity a coulter depth adjustment 20 secures the coulter at the required depth. The mechanical seeder 5 and hopper 7 are removably fitted within the elongated framework 1 by a dowel pin 21, shown on FIG. 5, which locates in a hole in the coulter 6 and a securing screw 22 presses a clamp, not shown, to secure the mechanical seeder 5 in position.

Figure 3:
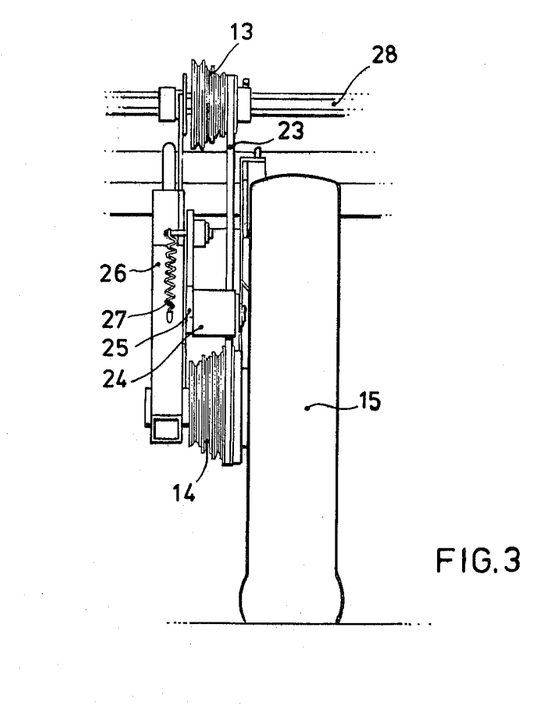
FIG. 3 shows a ground engaging wheel with shafting and feed speed changing gear.

FIG. 3 shows more clearly the ground engaging drive wheel 15 pulleys 13 and 14 and a belt drive 23. The ganged pulley wheels 13 and 14, each having four different sized pulleys, enables various speeds of seed feed for the same forward speed to be obtained. Tension of the drive belt 23 is maintained by a roller 24 located on an arm 25 pivotally mounted on a wheel stem 26 and loaded by a spring 27. A drive shaft 28 driven by pulley wheel 13 is suitably supported for driving a plurality of mechanical seeders.

Figures 4, 5A, 5B:
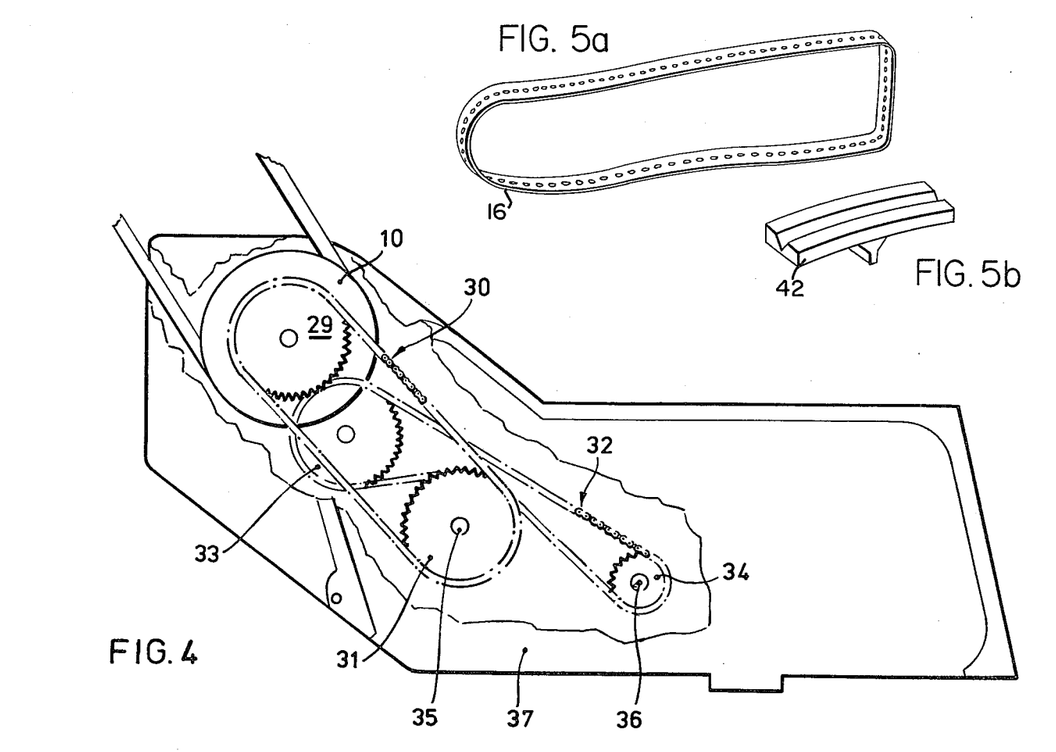
FIG. 4 shows a cut away side view showing the seed conveyor and seed rejector drives.
FIG. 5a shows the continuous seed conveyor having holes disposed along its length.
FIG. 5b shows the grooved pressure plate over which the seed conveyor passes.
Figure 5:
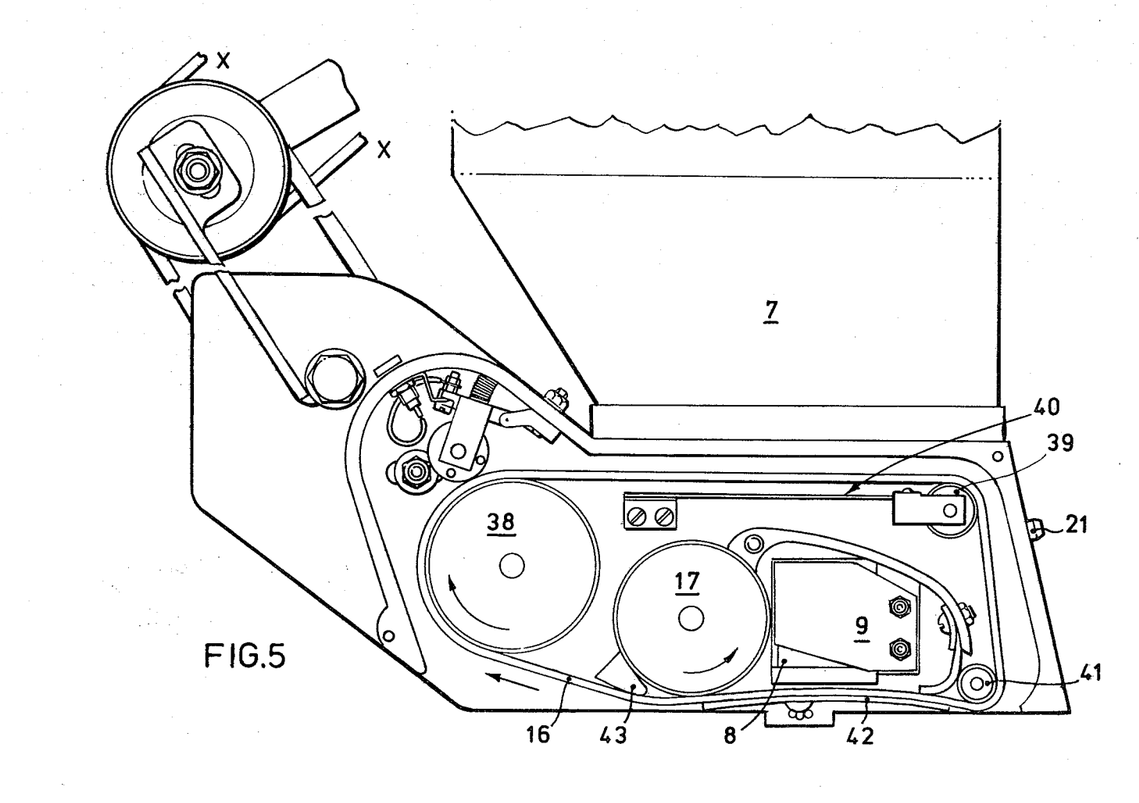
FIG. 5 shows a side view of the seed conveyor mechanism, hopper, seed chamber choke, seed rejector, electrical monitoring and external drive means.

FIG. 4, showing a cut away portion of the mechanical seeder 5, shows more clearly the drive mechanism for rotating the seed conveyor 16 and seed rejector 17, shown on FIG. 5. Rotation of pulley 10, also shown on FIGS. 1 and 2, drives a gear wheel 29 which through a chain drive 30 drives a ganged gear wheel 31. Rotation of the ganged gear wheel 31 drives a chain drive 32 suitably located over an idler gear 33 and a seed rejector gear wheel 34. Clockwise rotation of gear wheel 31 results in counterclockwise rotation of gear wheel 34. Shafts 35 and 36 protrude through a side 37 of the mechanical seeder 5 and are ball race mounted to increase operational life. The gear wheels and chains are encased in a removable cover which may be manufactured from any suitable material.

Referring now to FIG. 5 a seed conveyor driving wheel 38 driven on shaft 35 and the seed rejector wheel 17 driven on shaft 36 are shown. Preferably shaft 35 is an integral part of the seed conveyor driving wheel 38. The seed rejector wheel 17 is mounted on a hexagonal and is removable for ease of tyre replacement. Integral manufacture of wheel 38 assists in interchangeability, i.e. easier removal or replacement. Rejector wheel 17 and its replaceable tyre form a seal thus preventing seed leakage. The seed conveyor 16 in the form of a continuous belt passes over the driving wheel 38, a tensioning wheel 39, tensioned by a leaf spring 40, an idler wheel 41, over a pressure plate 42, under and in close proximity to the peripheral surface of the seed rejector 17 and under a shoe 43 to complete the loop on the driving wheel 38.

In operation seed from the seed chamber 8 drops into cavities formed by holes in the seed conveyor 16 passing over the pressure plate 42, the pressure plate 42 may be smooth or may have a longitudinal groove or grooves therein dependent on type of seed. In general only one seed per cavity is required and to test the correct relationship between seed conveyor 16 and pressure plate 42 simply insert one seed in the cavity, lightly brush a finger across the top of the cavity and the seed should remain within the cavity. With two seeds placed in the cavity light brushing of a finger should dislodge the second seed from the cavity. At times more than one seed cavity is required in which case the cavity is enlarged. Movement of the seed conveyor 16 under the seed rejector 17 dislodges excess seeds and tends to throw them upwards towards the seed chamber 8. When the cavity reaches the end of the pressure plate a hole is formed and the seed falls through where it drops through the coulter 6 and is deposited in the ground. A harrow, rake or scuffer attachment 44, shown on FIG. 2, covers the seed with earth and as the mechanical machinery moves forward the roller type rear wheel compresses the ground above the seed or compresses the ground on the two sides of the furrow formed by the coulter 6 dependent on type of rear wheel fitted.

Figures 6A, 6B, 6C:
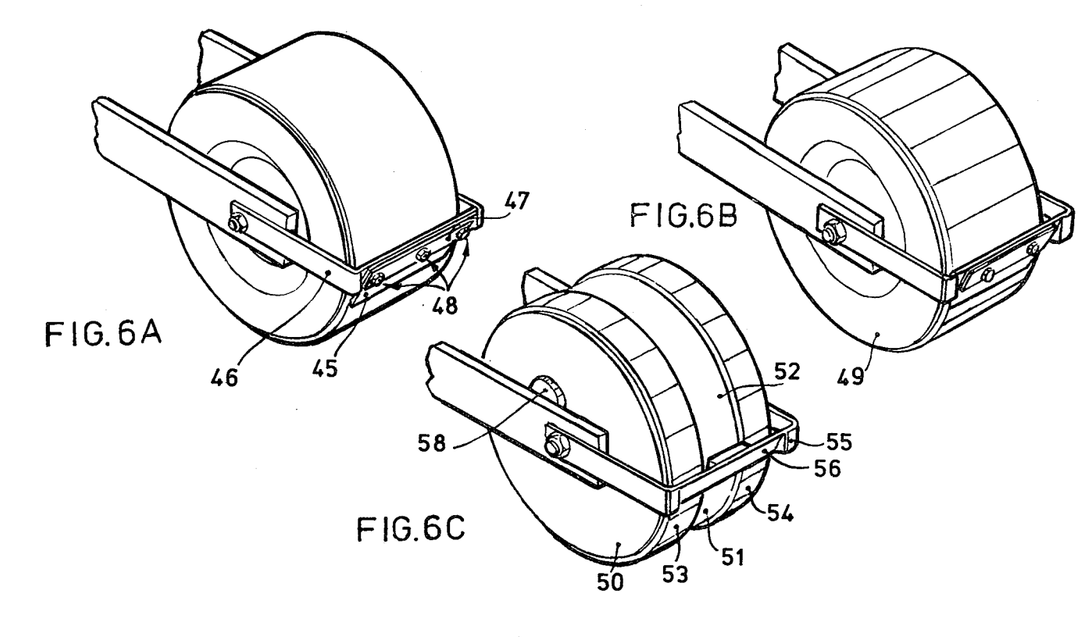
FIGS. 6a and 6b show examples of non stick rear wheels.
FIG. 6c shows an example of anti-capping wheel.

From FIGS. 6a, b and c, it will be seen that various types of wheel may be developed for specific types of soil in order to obtain the best results. The wheels may be made as one wide wheel utilizing a single scraper attachment or may be made as a whole from different width and diameter wheels with scrapers to suit. Furthermore as previously stated the rear wheel may be of an open mesh type and may be fitted with a scraper inside the wheel or on the outside of the wheel. The peripheral surface of the wheel may be covered with a steel band or hard rubber. FIG. 6a shows a wide steel band wheel with a scraper 45 clamped to a scraper bracket 46 by a plate 47 retained in position by nuts and bolts 48. FIG. 6b shows a narrower steel wheel with a rubber tyre 49 adhered to the peripheral surface. It also shows a modified scraper attachment having the same basic fitment means as shown in FIG. 6a and the same basic principle of operation. FIG. 6c shows an anti-capping wheel comprising two basic wheels 50 and 52. Scraper 51 is fitted between these wheels 50 and 52 which are both (optionally) capped with rubber tyres 53 and 54 respectively. A scraper attachment 55 has a scraping edge 56 for scraping wheels 50 and 52. Wheels 50 and 52 each have a hole in the outward facing circular face sealed with a rubber bung 58, to allow access to a grease point.

Figure 7A:
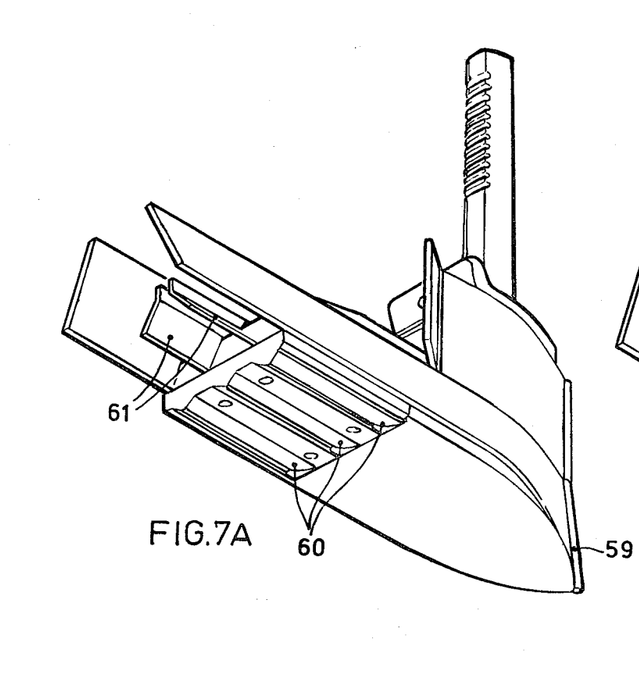
FIGS. 7a, 7b, 7c and 7d show various examples of coulters.
Figure 7B:
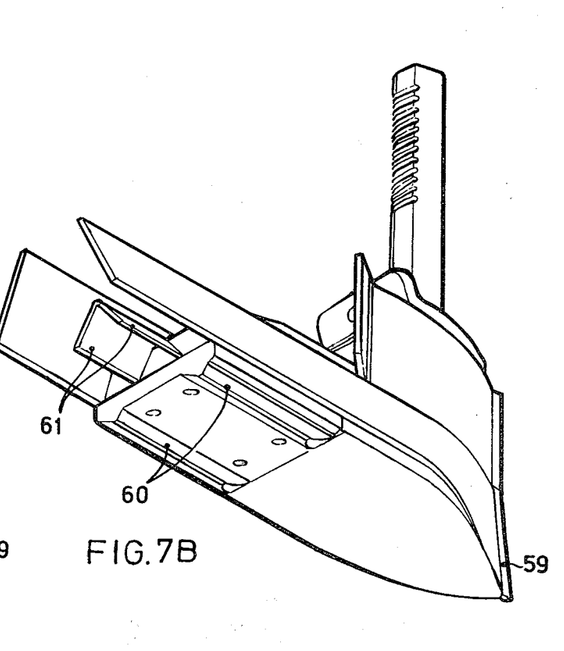
Figures 7C, 7D:
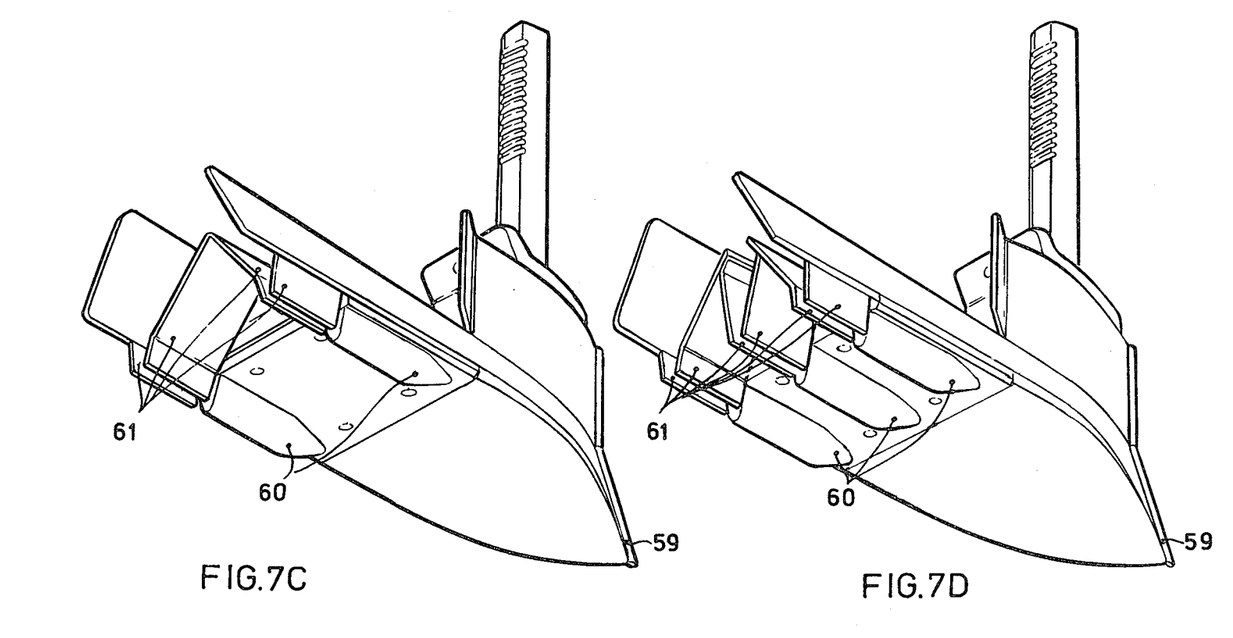

FIGS. 7a, b, c and d, show four types of coulter for multi row sowing from one mechanical seeder. The sharp front end 59 of the coulter ploughs out a shallow flat furrow in the ground and the V-shaped following portions 60 of the coulter form shallow V-shaped grooves in the flat furrow into which the seeds drop, guided by the seed guide plates 61. Various combinations of this form may be obtained dependent on rows per run per mechanical seed required in combination with an appropriate seed conveyor belt. Single row sowing per run per mechanical seeder may be achieved by using a coulter having a single furrow former. The mechanical seeder may be driven from the rear wheel 3 without the use of the ground engaging drive wheel 15 and drive attachments.

Multi row sowing may be achieved by paralleling a plurality of mechanical seeders, mounted on elongated frameworks each having a wheel at the front and rear, all driven from a common drive shaft driven by at least one ground engaging drive wheel. Tandem drilling may be achieved where necessary for drilling rows closer together by towing for example five mechanical seeders in parallel as a front row of mechanical seeders with a second row of four parallel mechanical seeders towed in the rear of the first row and located to sow seeds in the gaps between the front five mechanical seeders. All nine mechanical seeders may be driven from a common shaft driven by at least one ground engaging drive wheel. Drives from the common shaft to the rear mechanical seeders may be by pulley wheels and belts or chain drivers, or two drive shafts may be used, one for the front row of mechanical seeders and one for the rear row, the rear drive shaft being driven from the front drive shaft by a chain drive, or by another ground engaging drive wheel. The latter is the preferred method as it enables greater standardisation of the drive system.

What we claim is:

1. Seed spacing means comprising a seed container operatively connected so as to feed seed to a seed chamber, the chamber having an endless seed conveyor passing therethrough from front to rear in direction of motion, at least one row of longitudinally spaced apertures in the seed conveyor forming cavities for the retention of seed when passing over and upon a spring base means located beneath said conveyor, rotatable seed rejection means rotating in a direction opposite to that of said seed conveyor for ejection of excess seed, the space relationship between the spring base and seed conveyor being such that the seed remains within said cavities and does not project above the surface of said seed conveyor, means at the end of said spring base means through which said seed is discharged from said seed chamber, said seed spacing means being located upon an elongated support framework towably mounted on front and rear wheels.

2. The seed spacing means of claim 1 wherein the spring base means contains at least one longitudinal groove operatively aligned with said spaced apertures.

* * * * *